(12) United States Patent
Ramirez et al.

(10) Patent No.: US 10,006,365 B2
(45) Date of Patent: Jun. 26, 2018

(54) AIR SUPPLY AND CONDITIONING SYSTEM FOR A GAS TURBINE

(71) Applicant: General Electric Company, Schenectady, NY (US)

(72) Inventors: Juan Leonardo Soria Ramirez, Queretaro (MX); Ismael Orozco Arciga, Queretaro (MX); Luis Alberto Aguado Mandujano, Queretaro (MX); Humberto Sanchez Moreno, Queretaro (MX)

(73) Assignee: General Electric Company, Schenectady, NY (US)

( * ) Notice: Subject to any disclaimer, the term of this patent is extended or adjusted under 35 U.S.C. 154(b) by 264 days.

(21) Appl. No.: 14/755,406

(22) Filed: Jun. 30, 2015

(65) Prior Publication Data

US 2017/0002739 A1  Jan. 5, 2017

(51) Int. Cl.
| | |
|---|---|
| *F02C 6/08* | (2006.01) |
| *F02C 7/14* | (2006.01) |
| *F02C 7/05* | (2006.01) |
| *F02C 7/141* | (2006.01) |
| *F25B 9/04* | (2006.01) |

(Continued)

(52) U.S. Cl.
CPC .............. *F02C 7/141* (2013.01); *F02C 6/08* (2013.01); *F02C 7/052* (2013.01); *F02C 7/055* (2013.01); *F25B 9/04* (2013.01); *B01D 53/26* (2013.01); *F05D 2220/32* (2013.01);
(Continued)

(58) Field of Classification Search
CPC ........ F02C 6/06; F02C 6/08; F02C 7/052055; F02C 7/057; F02C 7/04; F02C 7/141; F02C 7/143; F02C 7/185; F05D 2260/209; F05D 2260/213; F05D 2260/604; F05D 2260/607; B64D 33/02; B64D 2033/0246; F01D 25/002
See application file for complete search history.

(56) References Cited

U.S. PATENT DOCUMENTS

| | | | |
|---|---|---|---|
| 6,828,602 B2 | 12/2004 | Asai et al. | |
| 8,628,602 B2 | 1/2014 | Heer | |

(Continued)

FOREIGN PATENT DOCUMENTS

| | | |
|---|---|---|
| EP | 1 950 407 A2 | 7/2008 |
| EP | 2 666 991 A2 | 11/2013 |

OTHER PUBLICATIONS

Extended European Search Report and Opinion issued in connection with corresponding EP Application No. 16175744.8 dated Nov. 22, 2016.

*Primary Examiner* — Andrew Nguyen
(74) *Attorney, Agent, or Firm* — Dority & Manning, P.A.

(57) ABSTRACT

An air supply and conditioning system for an inlet system of a gas turbine includes an air processing unit having an inlet configured to receive compressed air from a compressor of the gas turbine. The air processing unit includes a heat exchanger that is downstream from the inlet. A vortex cooler is disposed downstream from the inlet of the air processing unit. The vortex cooler is in fluid communication with the heat exchanger and with an outlet of the air processing unit. The system further includes a self-cleaning filter that is disposed within a duct of the inlet system. The self-cleaning filter is in fluid communication with at least one of the outlet of the air processing unit or an outlet of the vortex cooler.

14 Claims, 4 Drawing Sheets

(51) Int. Cl.
*F02C 7/052* (2006.01)
*F02C 7/055* (2006.01)
*B01D 53/26* (2006.01)

(52) U.S. Cl.
CPC .. *F05D 2260/209* (2013.01); *F05D 2260/607* (2013.01); *Y02T 50/675* (2013.01)

(56) References Cited

U.S. PATENT DOCUMENTS

| | | | |
|---|---|---|---|
| 2005/0050901 A1* | 3/2005 | Little | F01D 5/08 60/785 |
| 2008/0209914 A1 | 9/2008 | De Wergifosse et al. | |
| 2014/0044517 A1 | 2/2014 | Saha et al. | |

\* cited by examiner

AIR SUPPLY AND CONDITIONING SYSTEM FOR A GAS TURBINE

FIELD OF THE INVENTION

The subject matter disclosed herein relates to a gas turbine, and more particularly to an air supply and conditioning system for supplying compressed air to self-cleaning filters of an inlet system of the gas turbine.

BACKGROUND OF THE INVENTION

A gas turbine includes, in serial flow order, a compressor, a combustion section and a turbine. In particular configurations, the gas turbine includes an inlet system positioned upstream from an inlet to the compressor. The inlet system generally includes various filters, cooling coils, moisture separators, and/or other devices which may be used to purify and otherwise condition air or other working fluid entering the gas turbine. In particular configurations, the filters may be self-cleaning.

Gas turbine systems often include an air processing unit (APU) that provides an air supply for pulsing compressed air across and/or through the self-cleaning filters, thus blowing debris and/or contamination away from the filters. In addition, the APU may provide an air supply to one or more valves as instrument air. The air supplied to the APU is typically extracted directly from the compressor. For example, the air may be extracted from an extraction port disposed at a particular stage of the compressor and/or from a discharge casing that is downstream from the compressor.

The air extracted from the compressor is relatively hot (i.e. 400-800° F.) and requires substantial cooling and lowering of pressure prior to injection into the filter housing. Various devices such as air-to-air heat exchangers and pressure reduction valves are provided within the APU to cool and reduce pressure of the air supply upstream from the inlet and/or instrumentation. However, in warm climates, the air-to-air heat exchangers may struggle to provide sufficient cooling to the air upstream from the inlet system. Accordingly, an improved air supply and conditioning system for a gas turbine system would be useful.

BRIEF DESCRIPTION OF THE INVENTION

Aspects and advantages of the invention are set forth below in the following description, or may be obvious from the description, or may be learned through practice of the invention.

One embodiment of the present invention is an air supply and conditioning system for an inlet system of a gas turbine. The air supply and conditioning system includes an air processing unit having an inlet configured to receive compressed air from a compressor of the gas turbine. The air processing unit includes a heat exchanger that is downstream from the inlet. A vortex cooler is disposed downstream from the inlet of the air processing unit. The vortex cooler is in fluid communication with the heat exchanger and with an outlet of the air processing unit. The system further includes a self-cleaning filter that is disposed within a duct of the inlet system. The self-cleaning filter is in fluid communication with at least one of the outlet of the air processing unit or an outlet of the vortex cooler.

The present invention also includes a gas turbine. The gas turbine includes an inlet system, a compressor disposed downstream from the inlet system, a combustion section that is positioned downstream from the compressor and a turbine that is positioned downstream from the combustion section. The inlet system includes an inlet duct and at least one self-cleaning filter disposed within the inlet duct. The gas turbine further includes an air supply and conditioning system that is in fluid communication with the compressor and with the at least one of one or more self-cleaning filters. The air supply and conditioning system includes an air processing unit having an inlet configured to receive compressed air from the compressor of the gas turbine and that includes a heat exchanger disposed downstream from the inlet. A vortex cooler is disposed downstream from the inlet of the air processing unit and is in fluid communication with the heat exchanger and with an outlet of the air processing unit. The self-cleaning filter is in fluid communication with an outlet of the vortex cooler.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
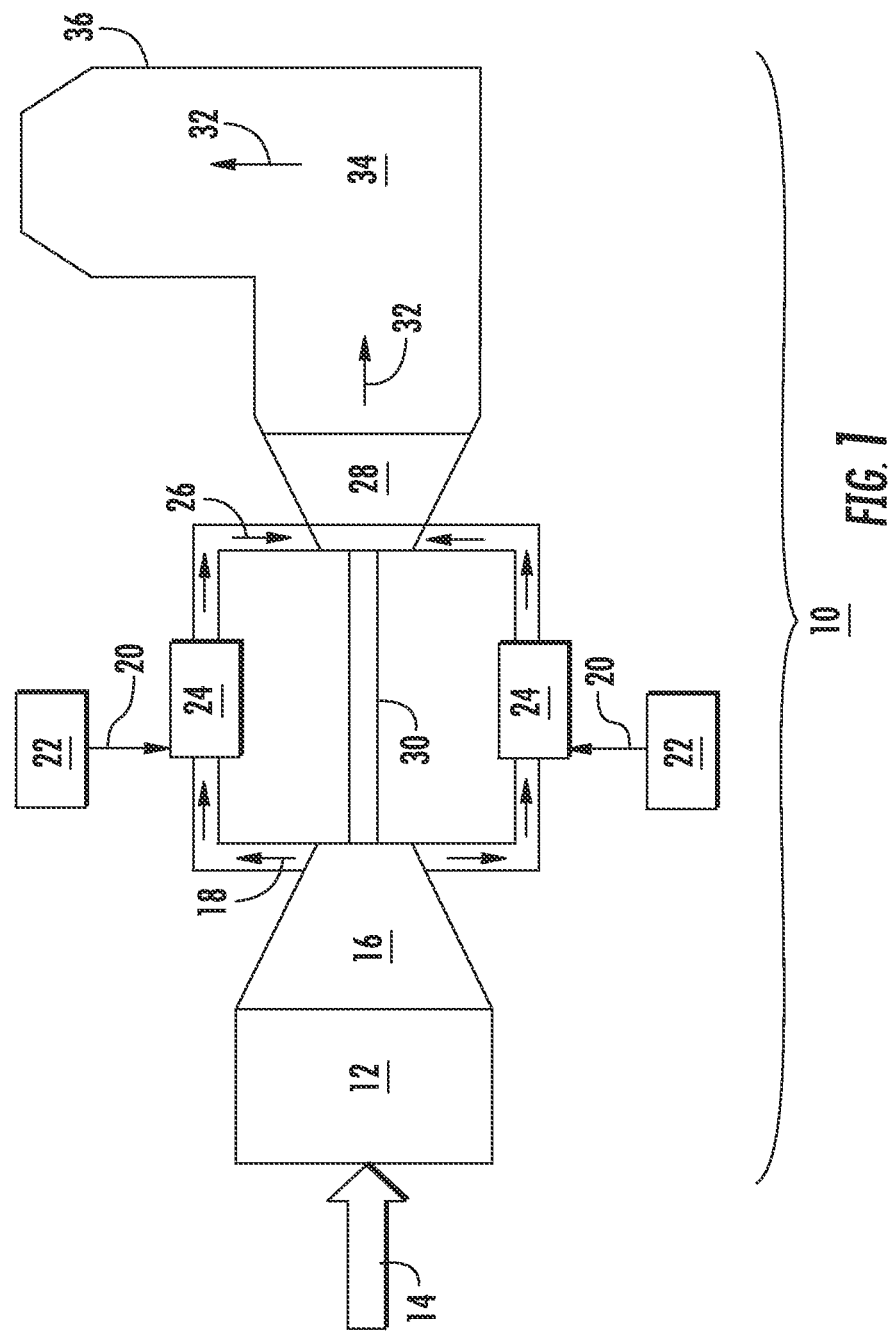
FIG. 1 is a functional block diagram of an exemplary gas turbine that may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of an air supply and conditioning system for a land based power generating gas turbine for purposes of illustration, one of ordinary skill in the art will readily appreciate that embodiments of the present invention may be applied to any inlet system for any type of gas turbine such as a marine or aircraft gas turbine and are not limited to land based power generating gas turbines unless specifically recited in the claims.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet system 12 that may include a series of filters, cooling coils, moisture separators, and/or other devices to purify and otherwise condition a flow of air or airstream 14 or other working fluid entering the gas turbine 10. The air 14 flows from the inlet system 12 to a compressor section where a compressor 16 progressively imparts kinetic energy to the air 14 to produce compressed air 18.

The compressed air 18 is mixed with a fuel 20 from a fuel supply system 22 to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed air 18. Alternately or in addition, the shaft 30 may connect the turbine 28 to a generator (not shown) for producing electricity. Exhaust gases 32 from the turbine 28 flow through an exhaust section 34 that connects the turbine 28 to an exhaust stack 36 downstream from the turbine 28. The exhaust section 34 may include, for example, a heat recovery steam generator (not shown) for cleaning and extracting additional heat from the exhaust gases 32 prior to release to the environment.

Figure 2:
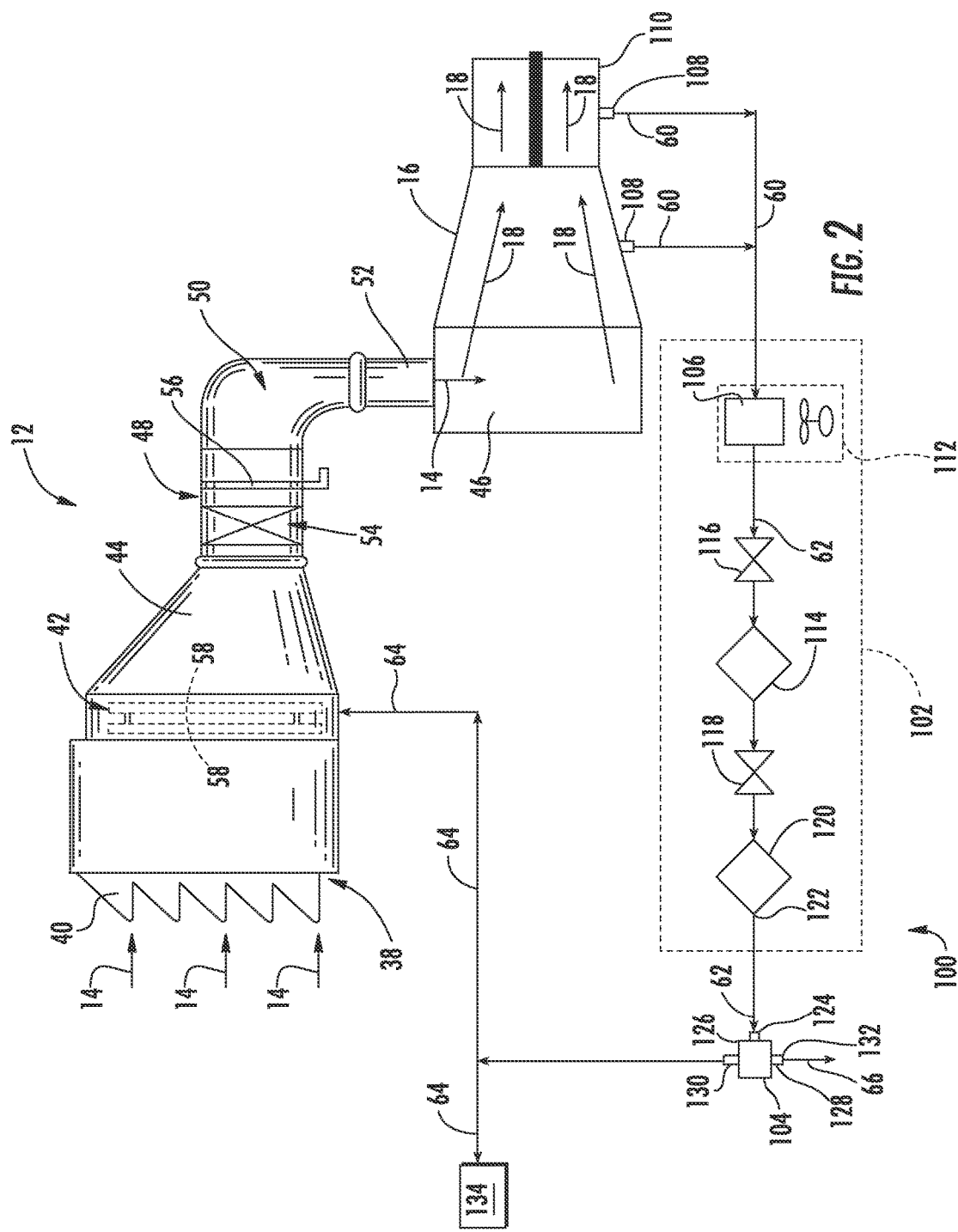
FIG. 2 is a schematic block diagram of the gas turbine as shown in FIG. 1 including an exemplary embodiment of an air supply and conditioning system according to at least one embodiment of the present invention.

FIG. 2 is a schematic illustration of an air supply and conditioning system 100 herein referred to as "system" for supplying air to self-cleaning filters of the inlet system 12 of the gas turbine. As shown in FIG. 2, the inlet system 12 includes an inlet portion 38 that may include one or more weather hoods or louvers 40. The inlet portion 38 provides a flow path for the air 14 to enter an inlet filter compartment 42 from the ambient surroundings. An inlet duct 44 is configured to contain and route the air 14 to an inlet plenum 46.

The inlet duct 44 may include numerous sections that may vary in orientation and geometric configuration. For example, a first duct portion 48 is shown as having a relatively horizontal orientation prior to redirection through an elbow 50 to a second duct portion 52 having a relatively vertical orientation. Various other components may be disposed within either the first duct portion 48 or the second duct portion 52. Such components may include a silencer 54 and/or an inlet bleed heat arrangement 56. The inlet plenum 46 may be configured to provide a relatively turbulent-free region for immediate entry of the air 14 to the compressor 16. In various embodiments, the inlet filter compartment 42 includes at least one, but typically a plurality of filters 58 (shown in dotted lines) that are self-cleaning.

Still referring to FIG. 2, were a first embodiment of an air supply and conditioning system 100 is illustrated. As shown in FIG. 2, the system 100 includes an air processing unit (APU) 102 that is in fluid communication with the compressor 18 and a vortex cooler 104 that is disposed downstream from the APU 102 and upstream from the plurality of filters 58.

An inlet 106 of the APU 102 is in fluid communication with the gas turbine 10 via one or more air extraction ports 108 and various fluid couplings and/or conduits (not shown). For example, in one embodiment, the extraction port 108 may provide for fluid communication from an intermediate portion or stage of the compressor 16 to the inlet 106 of the APU 102. In addition or in the alternative, the extraction port 108 may provide for fluid communication from a compressor discharge casing 110 that is positioned downstream from the compressor 16 to the inlet 106 of the APU 102. In this manner, a portion of the compressed air 18 flowing through the compressor 16 and or within the compressor discharge casing 110 as indicated schematically by arrows 60 may be extracted therefrom and routed to the inlet 106 of the APU 102.

The APU 102 may include various components and/or valves for conditioning the compressed air 60 from the extraction port(s) 108. For example, the APU 102 may include a heat exchanger 112 fluidly coupled to the inlet 106 of the APU 102. In particular embodiments, the heat exchanger 112 may be an air-to-air or an air-to-liquid type heat exchanger. The APU 102 may also include one or more other components that may include a water separator 114, one or more pressure regulating valves 116, 118 and/or a heatless air dryer 120. An outlet 122 of the APU 102 fluidly connects the vortex cooler 104 to the APU 102.

In operation, as shown collectively in FIG. 2, the compressed air 60 flows from the extraction port(s) 108 into the heat exchanger 112 via inlet 106. The compressed air 60 may enter the inlet 106 of the APU 102 at a first temperature and a first pressure. The first temperature may be about 400° F. to about 800° F. depending on the operation of the gas turbine and/or the locations of the extraction port(s) 108. The first pressure may be about 250 psia and is also dependent on the location of the extraction port(s) 108.

In one embodiment, as shown in FIG. 2, the heat exchanger 112 cools the compressed air 60 to a second temperature while maintaining a relatively constant pressure, thus providing a cooler compressed air as schematically indicated by arrows 62, with respect to compressed air 60, to the various other components of the APU 102. For example, compressed air 62 may flow through one or more of the pressure reduction valves 116, 118, the water separator 114 and the heatless air dryer 120. The compressed air 62 may then be routed from the outlet 122 of the APU 102 to an inlet 124 of the vortex cooler 104 via various fluid couplings and/or conduits (not shown).

The compressed air 62 is then injected tangentially into the vortex cooler 104 through a generator (not shown) and into a vortex spin chamber 126 of the vortex cooler 104. The compressed air 62 spins in an outer vortex towards a hot end 128 of the vortex generator 104 and a portion of compressed air 62 may escape through a control valve (not shown). Still spinning, the remaining compressed air 62 reverses direction and forms an inner vortex that is forced back through the center of the outer vortex formed by the compressed air 62 flowing towards the hot end 128. The inner vortex gives off kinetic energy in the form of heat to the outer vortex and exits the vortex cooler 104 via outlet 130 as cooled compressed air as schematically indicated by arrows 64 at a third temperature and pressure which are lower than the temperature and pressure of the compressed air 62 exiting the APU 102. For example, compressed air 64 may exit the vortex cooler at about 70° F. to about 150° F. and preferably at about 100 psia.

The remaining compressed air 62 exits as hot air as schematically indicated by arrows 66 through an outlet 132 disposed at the hot end 128 opposite outlet 130. A portion of the cooled compressed air 64 may be distributed to one or more valves 134 as instrument air. Another portion of the cooled compressed air 64 is then routed via various fluid couplings (not shown) to the self-cleaning filters 58. Various valves (not shown) in fluid communication with the self-cleaning filters 58 may be actuated or opened, thus allowing the cooled compressed air 64 to flow across and/or blow through the filters, thereby clearing debris therefrom.

Figure 3:
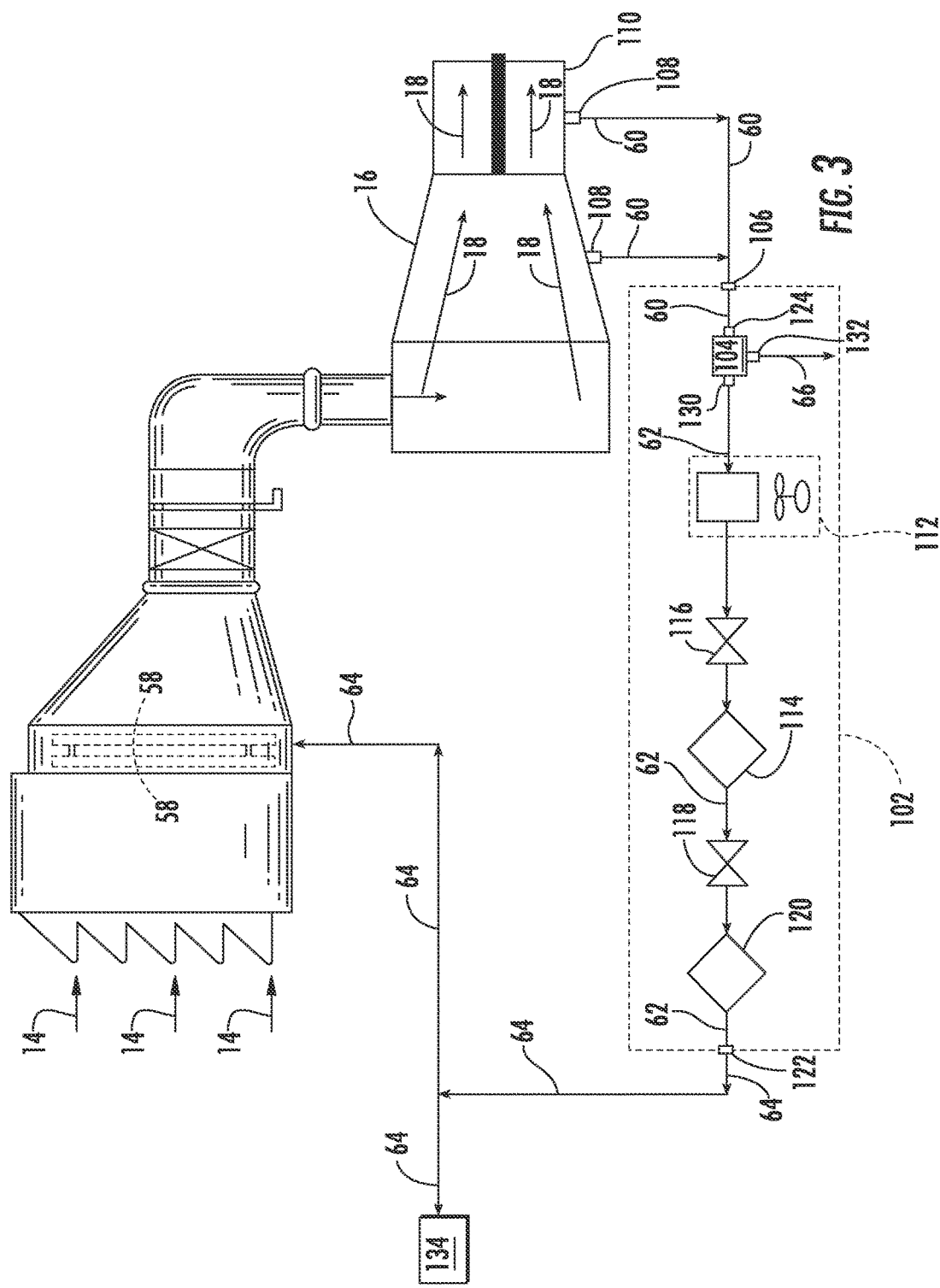
FIG. 3 is a schematic block diagram of the gas turbine as shown in FIG. 1 including an exemplary embodiment of an air supply and conditioning system according to at least one embodiment of the present invention.
Figure 4:
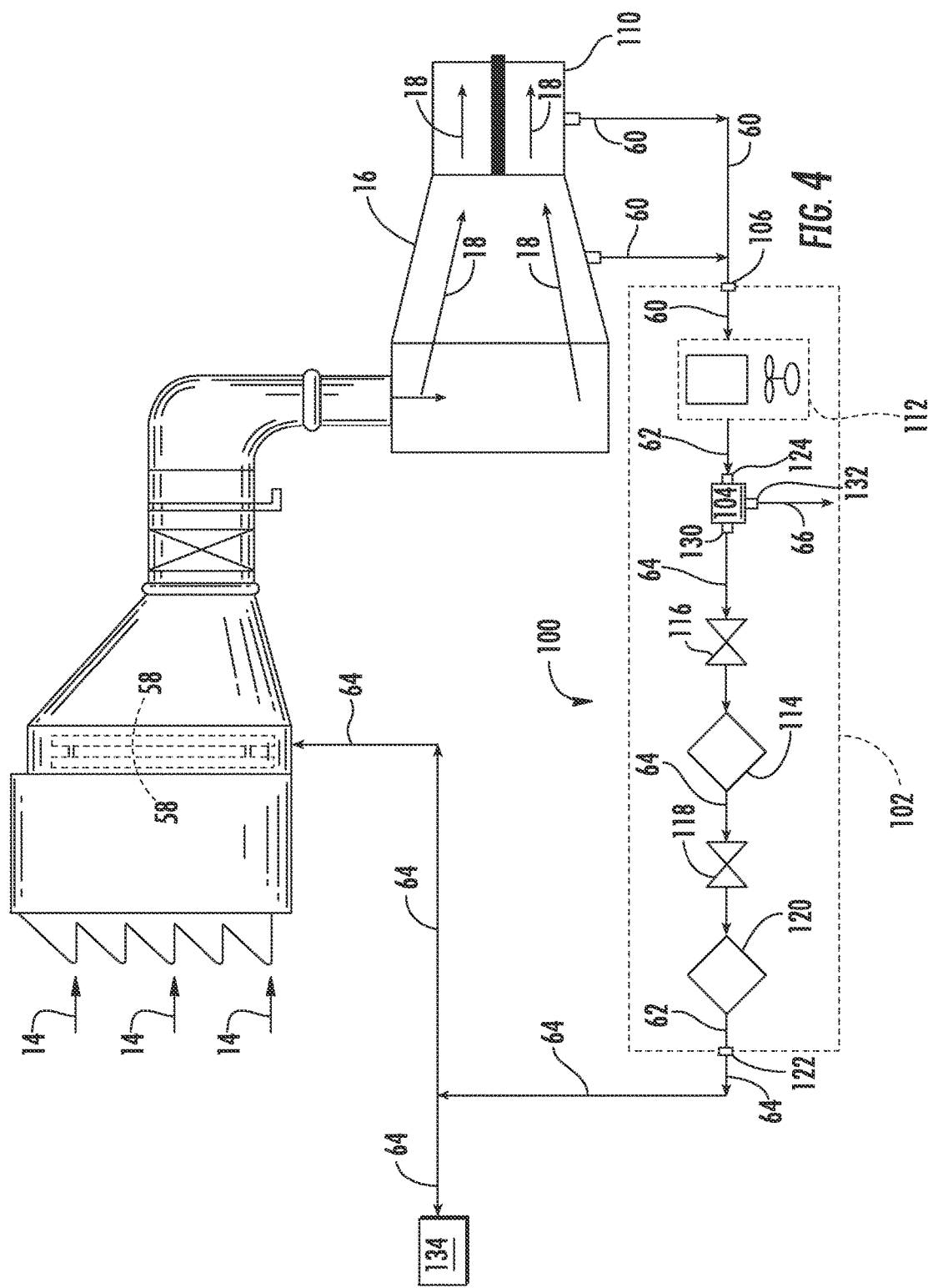
FIG. 4 is a schematic block diagram of the gas turbine as shown in FIG. 1 including an exemplary embodiment of an air supply and conditioning system according to at least one embodiment of the present invention.

FIGS. 3 and 4 provide schematic illustrations of the air supply and conditioning system 100 according to a second and third exemplary embodiment respectfully. In particular embodiments, as shown in FIGS. 3 and 4, the vortex cooler 104 may be disposed between the inlet 106 and the outlet 122 of the APU 102. For example, in one embodiment as shown in FIG. 3, the vortex cooler 104 may be disposed downstream from the inlet 106, upstream from the heat exchanger 112 and upstream from the outlet 122 of the APU 102.

In operation, as shown in FIG. 3, the compressed air 60 enters the inlet 124 of the vortex cooler 104. The compressed air 60 is then cooled and the pressure reduced. The cooler compressed air 62 may then flow into the heat exchanger 112 for additional cooling before passing the compressed air 62 to the various other components of the APU 102. The compressed air 62 flows from the outlet of the APU 102 as cooled compressed air, as schematically illustrated by arrows 64. A portion of the cooled compressed air 64 may be distributed to the one or more valves 134 as instrument air. Another portion of the cooled compressed air 64 is then routed via various fluid couplings (not shown) to the self-cleaning filters 58. Various valves (not shown) in fluid communication with the self-cleaning filters 58 may be actuated or opened, thus allowing the cooled compressed air 64 to flow across and/or blow through the self-cleaning filters, thereby clearing debris therefrom.

In the third embodiment, as shown in FIG. 4, the vortex cooler 104 may be disposed downstream from the heat exchanger 112 and upstream from the outlet 122 of the APU 102. In operation, the compressed air 60 enters the heat exchanger 112 where it is cooled. The cooled compressed air 62 then flows into the inlet 124 of the vortex cooler 104. The cooled compressed air 62 is then further cooled and the pressure reduced. The cooled compressed air 64 flows from the outlet 130 of the vortex cooler 104 to the various other components of the APU 102. A portion of the cooled compressed air 64 is then routed via various fluid couplings (not shown) to the self-cleaning filters 58. Various valves (not shown) in fluid communication with the self-cleaning filters 58 may be actuated or opened, thus allowing the cooled compressed air 64 to flow across and/or blow through the filters, thereby clearing debris therefrom. In particular embodiments, a portion of the cooled compressed air 64 may be distributed to the one or more valves 134 as instrument air.

The system 100 as shown in FIGS. 2-4 and as described herein provides a method for supplying compressed air to the self-cleaning filters 58 of the inlet system 12. For example, the method may include flowing the compressed air 60 from the compressor to the inlet of the APU 102, flowing the compressed air 62 from the APU 102 to the inlet of the vortex cooler 104 and then routing the cooled compressed air 64 to the one or more self-cleaning filters 58. The method may also include reducing the temperature of the compressed air 60 from about 400-800 degrees Fahrenheit to about 50-150 degrees Fahrenheit and the pressure of the compressed air 60 from about 250 psia to about 100 psia downstream from the outlet of the vortex cooler 104 and upstream from the self-cleaning filter(s) 58.

The system 100 as shown in FIGS. 2, 3 and 4 and as described herein provides various technical benefits over know air supply and conditioning systems used to provide compressed air to inlet systems, particularly to self-cleaning filters. For example, the vortex cooler 104 allows for effective cooling of the compressed air 60 flowing from the compressor 16 and/or the compressor discharge casing 110 in environments where the APU 102, particularly the heat exchanger 112 of the APU 102, is incapable of sufficiently cooling the compressed air 60 for use in the self-cleaning filers 58. This may be particularly beneficial in areas having high ambient temperatures and where the heat exchanger 114 is an air-to-air type heat exchanger.

In particular embodiments, such as in FIG. 3, where the vortex cooler 104 is disposed upstream from the heat exchanger 112, a smaller heat exchanger 112 may be used, thus saving costs. In addition or in the alternative, if install upstream the vortex cooler 104 can improve the heat exchange capability by removing moisture of the air 60 and reducing the pressure of the compressed air 60. By installing the vortex cooler 104 downstream from the heat exchanger 112, the heat exchanger capacity may be increased, particularly in areas having high ambient temperatures and where the heat exchanger 114 is an air-to-air type heat exchanger.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An air supply and conditioning system for an inlet system of a gas turbine, comprising:
   an air processing unit having an inlet configured to receive compressed air from a compressor of the gas turbine, wherein the air processing unit comprises a heat exchanger downstream from the inlet;
   a vortex cooler, wherein the vortex cooler is in fluid communication with the heat exchanger and with an outlet of the air processing unit; and
   a self-cleaning filter disposed within a duct of the inlet system, wherein the self-cleaning filter is in fluid communication with at least one of the outlet of the air processing unit or an outlet of the vortex cooler;
   wherein the vortex cooler is disposed immediately downstream from the heat exchanger and upstream from the outlet of the air processing unit.

2. The air supply and conditioning system of claim 1, wherein the heat exchanger is an air-to-air heat exchanger.

3. The air supply and conditioning system of claim 1, wherein the air processing unit comprises at least one of a water separator, a pressure regulating valve or a heatless air dryer.

4. The air supply and conditioning system of claim 1, wherein the inlet of the air processing unit is fluidly coupled to the compressor via one or more extraction ports, wherein at least one extraction port of the one or more extraction ports is disposed along an intermediate portion of the compressor or along a compressor discharge casing positioned downstream from the compressor.

5. The air supply and conditioning system of claim 1, wherein the compressed air enters the inlet of the air processing unit at between about 400 degrees Fahrenheit and about 800 degrees Fahrenheit and exits the outlet of the vortex cooler at between about 50 degrees Fahrenheit and about 150 degrees Fahrenheit.

6. The air supply and conditioning system of claim 1, wherein the compressed air enters the inlet of the air processing unit at a pressure of about 250 psia and exits the outlet of the vortex cooler at about 100 psia.

7. The air supply and conditioning system of claim 1, further comprising one or more instruments disposed downstream from the vortex cooler.

8. A gas turbine, comprising:
an inlet system, a compressor downstream from the inlet system, a combustion section downstream from the compressor and a turbine downstream from the combustion section, the inlet system having an inlet duct and at least one self-cleaning filter disposed within the inlet duct; and
an air supply and conditioning system in fluid communication with the compressor and with the at least one self-cleaning filter, the air supply and conditioning system comprising:
an air processing unit having an inlet configured to receive compressed air from the compressor of the gas turbine, wherein the air processing unit comprises a heat exchanger downstream from the inlet; and
a vortex cooler, wherein the vortex cooler is in fluid communication with the heat exchanger and with an outlet of the air processing unit;
wherein the self-cleaning filter is in fluid communication with an outlet of the vortex cooler;
wherein the vortex cooler is disposed immediately downstream from the heat exchanger and upstream from the outlet of the air processing unit.

9. The gas turbine of claim 8, wherein the heat exchanger is an air-to-air heat exchanger.

10. The gas turbine of claim 8, wherein the air processing unit comprises at least one of a water separator, a pressure regulating valve or a heatless air dryer.

11. The gas turbine of claim 8, wherein the inlet of the air processing unit is fluidly coupled to the compressor via one or more extraction ports, wherein at least one extraction port of the one or more extraction ports is disposed along an intermediate portion of the compressor or along a compressor discharge casing positioned downstream from the compressor.

12. The gas turbine of claim 8, wherein the compressed air enters the inlet of the air processing unit at between about 400 degrees Fahrenheit and about 800 degrees Fahrenheit and exits the outlet of the vortex cooler at between about 50 degrees Fahrenheit and about 150 degrees Fahrenheit.

13. The gas turbine of claim 8, wherein the compressed air enters the inlet of the air processing unit at a pressure of about 250 psia and exits the outlet of the vortex cooler at about 100 psia.

14. The gas turbine of claim 8, further comprising one or more instruments disposed downstream from the vortex cooler.

* * * * *